(12) United States Patent
Mukai et al.

(10) Patent No.: US 9,447,296 B2
(45) Date of Patent: Sep. 20, 2016

(54) INK SET FOR INK JET RECORDING, AND RECORDING APPARATUS

(71) Applicant: Seiko Epson Corporation, Tokyo (JP)

(72) Inventors: Hiroshi Mukai, Shiojiri (JP); Akira Mizutani, Shiojiri (JP); Toshihiro Shinbara, Matsumoto (JP); Hironori Sato, Matsumoto (JP)

(73) Assignee: Seiko Epson Corporation (JP)

( * ) Notice: Subject to any disclaimer, the term of this patent is extended or adjusted under 35 U.S.C. 154(b) by 189 days.

(21) Appl. No.: 14/187,583

(22) Filed: Feb. 24, 2014

(65) Prior Publication Data

US 2014/0240393 A1 Aug. 28, 2014

(30) Foreign Application Priority Data

Feb. 22, 2013 (JP) ................................ 2013-032939

(51) Int. Cl.
*B41J 2/21* (2006.01)
*C09D 11/322* (2014.01)
(Continued)

(52) U.S. Cl.
CPC ............ *C09D 11/322* (2013.01); *B41J 2/2107* (2013.01); *C09D 11/38* (2013.01); *C09D 11/40* (2013.01); *B41J 2/16552* (2013.01)

(58) Field of Classification Search
CPC .......... B41J 2/01; B41J 2/211; B41J 2/1433; B41J 2/17; B41J 2/17593; B41J 2/2107; B41J 2/1755; B41J 2/2114; B41J 11/0015; B41J 11/002; B41J 2/2056; B41J 2/21; B41J 2/0057; B41J 3/60; C09D 11/36; C09D 11/40; C09D 11/30; C09D 11/38; C09D 11/322; C09D 11/328; C09D 11/101; C09D 11/005; C09D 11/54; C09D 11/52; B41M 5/0011; B41M 5/0017; B41M 7/00; B41M 7/0072; B41M 5/52; B41M 5/5218
USPC ................................... 347/95–102
See application file for complete search history.

(56) References Cited

U.S. PATENT DOCUMENTS

| 7,866,805 B2 | 1/2011 | Furukawa |
| 8,500,264 B2 | 8/2013 | Mukai et al. |

(Continued)

FOREIGN PATENT DOCUMENTS

| JP | 08-030200 | 7/1987 |
| JP | 04-261476 | 9/1992 |

(Continued)

OTHER PUBLICATIONS

Material Safety Data Sheet; Glycerin MSDS; Science Lab.com, Inc. (created: Oct. 10, 2005; Updated: May 21, 2013) (pp. 1-6).*

*Primary Examiner* — Manish S Shah
(74) *Attorney, Agent, or Firm* — Harness, Dickey & Pierce, P.L.C.

(57) ABSTRACT

An ink set includes a recording ink and a displacement ink. The recording ink contains a pigment, a resin, water, and a first surfactant and is substantially free of alkyl polyols with a normal boiling point of 280° C. or more. The displacement ink contains water, a second surfactant, an aprotic polar solvent, and an alkyl polyol with a normal boiling point of 280° C. or more. Each of the first surfactant and the second surfactant includes a silicone surfactant and/or a fluorosurfactant. The resin includes a water-soluble resin and/or a resin emulsion. The recording ink has a higher surface tension than that of the displacement ink.

19 Claims, 1 Drawing Sheet

(51) Int. Cl.
*C09D 11/38* (2014.01)
*C09D 11/40* (2014.01)
*B41J 2/165* (2006.01)

(56) References Cited

U.S. PATENT DOCUMENTS

| | | | |
|---|---|---|---|
| 2002/0140790 A1* | 10/2002 | Moriyama | B41J 2/2114 347/96 |
| 2008/0152828 A1 | 6/2008 | Mukai et al. | |
| 2008/0254265 A1* | 10/2008 | Ito | C09D 11/40 428/195.1 |
| 2010/0086691 A1 | 4/2010 | Mukai et al. | |
| 2010/0092675 A1 | 4/2010 | Aoki | |
| 2010/0201737 A1* | 8/2010 | Kariya | C09D 11/32 347/21 |
| 2012/0019588 A1* | 1/2012 | Mubarekyan | C09D 11/30 347/20 |

FOREIGN PATENT DOCUMENTS

| | | |
|---|---|---|
| JP | 06-008437 | 2/1994 |
| JP | 11-263021 | 9/1999 |
| JP | 11-263022 | 9/1999 |
| JP | 2000-094707 A | 4/2000 |
| JP | 2000-109733 A | 4/2000 |
| JP | 2000-328093 A | 11/2000 |
| JP | 2002-105500 A | 4/2002 |
| JP | 2008-023988 A | 2/2008 |
| JP | 2009-113494 A | 5/2009 |
| JP | 2009-114454 A | 5/2009 |
| JP | 2010-090271 A | 4/2010 |
| JP | 2010-094809 A | 4/2010 |
| JP | 2011-126147 A | 6/2011 |
| JP | 2013-129711 A | 7/2013 |
| JP | 2013-144742 A | 7/2013 |

* cited by examiner

INK SET FOR INK JET RECORDING, AND RECORDING APPARATUS

BACKGROUND

1. Technical Field

The present invention relates to an ink set for ink jet recording and to a recording apparatus.

2. Related Art

Ink jet recording apparatuses record images and characters by discharging very small droplets of ink through the nozzles of an ink jet recording head. An ink jet recording apparatus has some channels through which the ink flows, e.g., those for supplying the ink from an ink container, which contains the ink, to the ink jet recording head and those formed in the ink jet recording head to deliver the ink to nozzle openings (holes of the nozzles). These ink flow channels are often so small that various problems can occur; for example, these ink flow channels are likely to become clogged with the ink jet recording ink.

Examples of known solutions to such problems include removing the blockage in the ink flow channels and the nozzles and related defects by applying cleaning liquid or maintenance liquid to the surface of the nozzles to keep the surface moist or by passing cleaning liquid or maintenance liquid through the ink flow channels.

For example, JP-B-6-8437 and JP-B-8-30200 are intended to provide maintenance liquids for ink jet recording. These maintenance liquids are advantageous in the following ways: an ink system that includes ink flow channel and nozzles can be quickly clear of ink; maintenance liquid residue has no negative effects while the ink system is stored for a long period of time; the ink system can be quickly refilled with ink. JP-B-6-8437 discloses a maintenance liquid for ink jet recording that contains (a) at least one polyhydric alcohol selected from ethylene glycol, diethylene glycol, triethylene glycol, and propylene glycol, (b) at least one alcohol selected from methanol, ethanol, n-propanol, and isopropanol, and (c) water. JP-B-8-30200 also discloses a maintenance liquid for ink jet recording, and this maintenance liquid contains (a) at least one alcohol selected from methanol, ethanol, n-propanol, and isopropanol, (b) an anionic surfactant that has a functional group selected from —$SO_3M$, —$OSO_3M$, and —COOH (M: H, Li, Na, or K), and (c) water.

JP-A-4-261476 discloses a cleaning liquid for ink jet printers, which contains an aqueous medium and at least one specified compound so that the cleaning liquid can have excellent detergency and good antifungal and antibacterial effects.

JP-A-11-263021 discloses an ink jet printer used with a recording liquid based on an aqueous pigment. The ink jet printer is equipped with a head-cleaning liquid that removes thickened ink that accumulates on the surface of nozzle plates and the cap for the nozzles as water in the aqueous pigment-based recording liquid evaporates. As a result, the ink jet printer can be free of poor discharge, dirty nozzle plates, poor sealing, and other problems associated with adhering thickened ink.

JP-A-11-263022 discloses an ink jet printer. The ink jet printer is equipped with a recording liquid based on an aqueous pigment and a head-cleaning liquid. The recording liquid contains a dispersant and a fixing agent, and at least one of the dispersant and the fixing agent is an anionic water-soluble polymer that contains a carboxylic acid salt or an anionic surfactant that contains a carboxylic acid salt. The head-cleaning liquid is an alkaline solution of a nonionic surfactant and/or an anionic surfactant in water at a pH of less than 11. As a result, the ink jet printer can be free of poor discharge, dirty nozzle plates, poor sealing, and other problems associated with adhering thickened ink.

JP-A-2000-109733 is intended to provide an aqueous ink for ink jet recording and maintenance liquid and a method for maintaining an ink jet recording apparatus used with the ink. The aqueous ink for ink jet recording, according to the publication, has excellent dispersion stability, does not clog up nozzles, is unlikely to bleed at high concentrations, and, in particular, is highly resistant to water and washing. The disclosed aqueous ink composition contains an aqueous medium composed of at least water, pigment-colored resin particles contained in a resin (A) that has a carboxy group, and a base (B) and also contains a constituent (C) that forms cross-links with the resin (A).

JP-A-2000-328093 discloses an aqueous cleaning liquid for cleaning the printhead of ink jet printers. The aqueous head-cleaning liquid contains a silicone-based antifoam so that the head-cleaning liquid can be very unlikely to foam, have excellent detergency and antifungal and antibacterial effects, and should not clog up the printhead used therewith.

JP-A-2002-105500 relates to a cleaning liquid for ink jet printers and is intended to provide a cleaning liquid for ink jet printers that easily resolves problems associated with clogged nozzles by its excellent detergency. The disclosed cleaning liquid contains at least a water-soluble hydroxycarobylic acid salt, limonene, and a surfactant.

These cleaning liquids and maintenance liquids are, however, disadvantageous when used to clean ink flow channels of ink jet recording apparatuses. The user tries to remove the cleaning/maintenance liquid and refill the apparatus with the recording ink to resume recording; however, the cleaning/maintenance liquid cannot be easily removed, and this causes several problems. For example, cleaning/maintenance liquid residue in the recording ink may affect the quality of recordings, and bubbles left after incomplete refilling may block the ink flow channels. Furthermore, replacing the recording ink with the cleaning/maintenance liquid may cause ink residue to adhere to the walls and elsewhere inside the ink flow channels, and such adhering ink residue may clog up the ink flow channels. The issue of clogging becomes particularly significant when the recording ink contains a pigment as coloring material and a resin as fixing agent.

SUMMARY

An advantage of some aspects of the invention is that these aspects of the invention provide an ink set that allows for better refilling and is unlikely to cause clogging and a recording apparatus equipped with such an ink set.

After extensive research, the inventors found that such an ink set can be obtained as a combination of at least an appropriate recording ink and an appropriate displacement ink. The following describes some aspects of the completed invention.

[1] An ink set includes a recording ink and a displacement ink. The recording ink contains a pigment, a resin, water, and a first surfactant and is substantially free of alkyl polyols with a normal boiling point of 280° C. or more. The displacement ink contains water, a second surfactant, an aprotic polar solvent, and an alkyl polyol with a normal boiling point of 280° C. or more. Each of the first surfactant and the second surfactant includes a silicone surfactant and/or a fluorosurfactant. The resin includes a water-soluble resin and/or a resin emulsion. The recording ink has a higher surface tension than that of the displacement ink.

[2] In the ink set [1], the displacement ink may have a kinetic viscosity lower than that of the recording ink.

[3] In the ink set [1] or [2], the first surfactant and the second surfactant may include a surfactant of the same category.

[4] In the ink set any of [1] to [3], it is possible that the displacement ink and/or the recording ink contain an antifoam.

[5] In the ink set any of [1] to [4], the first surfactant may have a greater surface-tension-reducing effect on water than the second surfactant.

[6] An ink jet recording apparatus may have the ink set any of [1] to [5], an ink jet recording head, and an ink flow channel.

[7] The ink jet recording apparatus [6] may have a suction pump configured to replace the recording ink in the ink flow channel with the displacement ink and vice versa.

[8] In the ink jet recording apparatus [6] or [7], the suction pump may draw a greater total amount of the recording ink and the displacement ink when replacing the displacement ink in the ink flow channel with the recording ink than when replacing the recording ink in the ink flow channel with the displacement ink.

BRIEF DESCRIPTION OF THE DRAWINGS

The invention will be described with reference to the accompanying drawing.

The FIGURE is a perspective view of an example of the structure of a recording apparatus according to an embodiment of the invention.

DESCRIPTION OF EXEMPLARY EMBODIMENTS

The following describes some embodiments of the invention in detail while referring to the drawing as necessary. The invention is not limited to these embodiments; various modifications can be made without departing from the scope of the invention. The words that represent relative positions of components such as above, below, left, and right are based on the directions illustrated in the drawing unless otherwise specified. The relative sizes of the components are not necessarily as in the drawing.

1. Ink Set

An ink set according to an embodiment of the invention contains a recording ink and a displacement ink. The recording ink contains a pigment, a resin, water, and a first surfactant and is substantially free of alkyl polyols with a normal boiling point of 280° C. or more. The displacement ink contains water, a second surfactant, an aprotic polar solvent, and an alkyl polyol with a normal boiling point of 280° C. or more. Each of the first and second surfactants contains a silicone surfactant and/or a fluorosurfactant. The resin contains a water-soluble resin and/or a resin emulsion. The recording ink has a higher surface tension than that of the displacement ink. The recording ink and the displacement ink included in the ink set according to this embodiment flow through an ink flow channel and are discharged from a recording head. The recording ink is applied to a recording medium and forms a recording. The displacement ink flows through the same ink flow channel after the recording ink and displaces the recording ink in the ink flow channel; the displacement ink is similar to known cleaning liquids and maintenance liquids in terms of function.

1.2. Recording Ink

The recording ink contains a pigment, a resin, water, and a first surfactant and is substantially free of alkyl polyols with a normal boiling point of 280° C. or more. The recording ink in this embodiment flows through an ink flow channel of an ink jet recording apparatus and is discharged from nozzle openings to record an image on a recording medium. The term ink flow channel, as used herein, refers to the passages through which a liquid flows after leaving an ink container of the recording apparatus until discharge from the nozzles of a recording head. For example, the printer 1 illustrated in the FIGURE (described in detail hereinafter) has an ink flow channel consisting of an ink supply tube 20 and an ink distribution route (not illustrated) located in a printhead 2.

1.3. Displacement Ink

The displacement ink contains water, a second surfactant, an aprotic polar solvent, and an alkyl polyol with a normal boiling point of 280° C. or more. The displacement ink in this embodiment is used to clean the ink flow channel of the ink jet recording apparatus. The displacement ink can also be used to fill the ink flow channel of the ink jet recording apparatus before leaving the recording apparatus not in use in order for the recording ink not to dry out at and adhere to the nozzles.

1.4. Constituents of the Inks

The following describes the individual constituents of the recording ink and the displacement ink. The recording ink and the displacement ink may be hereinafter collectively referred to as the inks.

1.4.1. Pigment

The recording ink contains a pigment. The pigment can be of any kind; known pigments including those listed below can be used. Examples of inorganic pigments that can be used include, but are not limited to, carbon blacks (C.I. Pigment Black 7) such as furnace black, lamp black, acetylene black, and channel black, iron oxide, and titanium oxide.

Examples of organic pigments that can be used include, but are not limited to, azo pigments such as insoluble azo pigments, condensed azo pigments, azo lake pigments, and chelate azo pigments, polycyclic pigments such as phthalocyanine pigments, perylene and perinone pigments, anthraquinone pigments, quinacridone pigments, dioxane pigments, thioindigo pigments, isoindolinone pigments, and quinophthalone pigments, dye chelate pigments (e.g., basic-dye chelate pigments and acid-dye chelate pigments), dye lake pigments (e.g., basic-dye lake pigments and acid-dye lake pigments), nitro pigments, nitroso pigments, aniline black, and daylight fluorescent pigments.

For white ink, examples of pigments that can be used include, but are not limited to, white inorganic pigments, white organic pigments, and white hollow plastic particles. Examples of white inorganic pigments that can be used include the following: barium sulfate and other alkaline earth metal sulfates; calcium carbonate and other alkaline earth metal carbonates; particulate silicic acid, synthetic silicic acid salts, and similar silica compounds; calcium silicate, alumina, alumina hydrate, titanium oxide, zinc oxide, and similar metal compounds; and talc and clay. C.I. Pigment White 6, 18, and 21 can also be used.

For yellow ink, examples of pigments that can be used include, but are not limited to, C.I. Pigment Yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 155, 167, 172, 180, 185, and 213.

For magenta ink, examples of pigments that can be used include, but are not limited to, the following: C.I. Pigment Red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48 (Ca), 48 (Mn), 57 (Ca), 57:1, 88, 112, 114, 122, 123, 144, 146, 149, 150, 166, 168, 170, 171, 175, 176, 177, 178, 179, 184, 185, 187, 202, 209, 219, 224, and 245; and C.I. Pigment Violet 19, 23, 32, 33, 36, 38, 43, and 50.

For cyan ink, examples of pigments that can be used include, but are not limited to, the following: C.I. Pigment Blue 1, 2, 3, 15, 15:1, 15:2, 15:3, 15:34, 15:4, 16, 18, 22, 25, 60, 65, and 66; and C.I. Vat Blue 4 and 60.

For other ink colors, examples of pigments that can be used include, but are not limited to, the following: C.I. Pigment Green 7 and 10; C.I. Pigment Brown 3, 5, 25, and 26; and C.I. Pigment Orange 1, 2, 5, 7, 13, 14, 15, 16, 24, 34, 36, 38, 40, 43, and 63.

It is also possible to use two or more such pigments in combination.

The appropriate pigment content depends on the use of the recording ink. Preferably, the pigment content is in the range of 0.1% by mass to 30% by mass, both inclusive, more preferably 0.2% by mass to 20% by mass, both inclusive, based on the total mass of the recording ink.

1.4.2. Resin

The recording ink contains a resin. The resin improves the fixation of the recording ink to the recording medium. Although resins for such purposes generally solidify quickly, the ink set according to this embodiment allows for good refilling and provides good clogging prevention despite the presence of the resin.

Examples of resins that can be used include, but are not limited to, fiber resins such as acrylic resins, styrene-acrylic resins, rosin-modified resins, phenolic resins, terpene resins, polyester resins, polyamide resins, epoxy resins, polyurethane resins, vinyl chloride-vinyl acetate copolymers, and cellulose acetate butyrate and also vinyl toluene-α-methyl styrene copolymers. It is also possible to use two or more such water-soluble resins in combination.

The resin content of the recording ink is preferably in the range of 0.1% to 10.0% by mass, more preferably 0.5% to 5.0% by mass, so that the resulting recording can be more resistant to abrasion and the recorded image can be more glossy.

1.4.3. Water

The recording ink and the displacement ink contain water. Water is the main medium in the recording ink and the displacement ink and evaporates and disperses in the air as the inks dry. It is preferred to use water that contains the least possible amount of ionic impurities, including purified water such as ion-exchanged water, ultrafiltered water, reverse-osmosis-purified water, and distilled water as well as ultra-pure water. For the recording ink and the pigment dispersion used to prepare the recording ink, sterilized water obtained by techniques such as ultraviolet irradiation and the addition of hydrogen peroxide is also preferred; sterilized water allows the pigment dispersion and the recording ink to be stored for long periods of time without molds or bacteria occurring therein.

1.4.4. First and Second Surfactants

The recording ink contains a first surfactant. One effect the first surfactant has is to allow the recording ink to uniformly wet and spread on the recording medium. The amount of the first surfactant in the recording ink is preferably in the range of 0.1% to 1.0% by mass, more preferably 0.2% to 0.8% by mass, so that the recording ink can be easier to load and the resulting recording can be of higher image quality and dry faster.

The displacement ink contains a second surfactant. The second surfactant makes the displacement ink more effective in cleaning the ink flow channel in two ways. First, the second surfactant helps the displacement ink in wetting the ink flow channel. Second, the second surfactant reduces the surface tension of the displacement ink, thereby helping the displacement ink in penetrating into the recording ink and ink concentrate in the ink flow channel. The amount of the second surfactant in the displacement ink is preferably in the range of 0.1% to 1.0% by mass, more preferably 0.1% to 0.5% by mass, so that the recording ink can be more easily replaced with the displacement ink and vice versa.

Each of the first surfactant and the second surfactant includes a silicone surfactant and/or a fluorosurfactant. It is also possible that the first surfactant and/or the second surfactant include an acetylene glycol surfactant.

1.4.4.1. Silicone Surfactant

Examples of preferred silicone surfactants include, but are not limited to, polysiloxanes, such as polyether-modified organosiloxanes. Specific examples of silicone surfactants that can be used include, but are not limited to, BYK-306, BYK-307, BYK-333, BYK-341, BYK-345, BYK-346, BYK-347, BYK-348, and BYK-349 (trade names, BYK Japan KK) and KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (trade names, Shin-Etsu Chemical Co., Ltd.).

When the recording ink contains a silicone surfactant, the silicone surfactant content is preferably in the range of 0.1% to 1.0% by mass, more preferably 0.2% to 0.8% by mass, so that the recording ink can be easier to load and the resulting recording can be of higher image quality and dry faster. It is also possible that the recording ink contains two or more silicone surfactants. Likewise, when the displacement ink contains a silicone surfactant, the silicone surfactant content is preferably in the range of 0.1% to 1.0% by mass, more preferably 0.1% to 0.5% by mass, so that the recording ink can be more easily replaced with the displacement ink and vice versa. It is also possible that the displacement ink contains two or more silicone surfactants.

1.4.4.2. Fluorosurfactant

In general, fluorosurfactants reduce the surface tension of liquids more effectively than silicone surfactants and are preferred for use in the second surfactant in this embodiment of the invention. Examples of fluorosurfactants that can be used include, but are not limited to, perfluoroalkyl sulfonates, perfluoroalkyl carboxylates, perfluoroalkyl phosphates, perfluoroalkyl ethylene oxide adducts, perfluoroalkyl betaines, and perfluoroalkyl amine oxides. From reliability and other perspectives, the following compounds (1) to (6), in particular, compounds (1), (2), (3), and (5), are preferred:

$$CF_3CF_2(CF_2CF_2)_m-CH_2CH_2O(CH_2CH_2O)_nH \quad (1)$$

(where m is an integer of 0 to 10, and n is an integer of 0 to 40);

(where $R_f$ represents fluorine-containing groups including, but not limited to, —CF$_3$ and —CH$_2$CF$_3$, and m, n, and p are integers: m, 6 to 25; n, 1 to 4; p, 1 to 4);

(3)

(where M$^+$ is Li$^+$, Na$^+$, K$^+$, or NH$_4^+$);

$$[(R_fSO_2)_2]N^-M^+ \quad (4)$$

(where $R_f$ is —CF$_3$, —C$_2$F$_5$, —C$_3$F$_7$, or —C$_4$F$_9$, and M$^+$ is Li$^+$, Na$^+$, K$^+$, or NH$_4^+$);

$$[(RfSO_2)(RSO_2)]N^-M^+ \quad (5)$$

(where $R_f$ is —CF$_3$, —C$_2$F$_5$, —C$_3$F$_7$, or —C$_4$F$_9$, R is an alkyl group that contains 1 to 10 carbon atoms, and M$^+$ is Li$^+$, Na$^+$, K$^+$, or NH$_4^+$);

$$[(FSO_2)_2]N^-M^+ \quad (6)$$

(where M$^+$ is Li$^+$, Na$^+$, K$^+$, or NH$_4^+$).

Both of synthesized fluorosurfactants and commercially available ones can be used. Examples of commercial fluorosurfactants include, but are not limited to, the following: S-144 and S-145 (Asahi Glass Co., Ltd.); FLUORAD FC-170° C., FC-430, and FC-4430 (Sumitomo 3M Limited); FSO, FSO-100, FSN, FSN-100, and FS-300 (DuPont); and FT-250 and 251 (NEOS Company Limited). DuPont FSO, FSO-100, FSN, FSN-100, and FS-300 are preferred because these surfactants will provide the inks with good printing quality and high storage stability. It is also possible to use two or more fluorosurfactants in each ink.

When the recording ink contains a fluorosurfactant, the fluorosurfactant content is preferably in the range of 0.1% by mass to 10% by mass, more preferably 0.1% by mass to 5% by mass. The fluorosurfactant greatly helps the recording ink in wetting the recording medium when present in an amount of 0.1% by mass or more. Furthermore, when present in an amount of 10% by mass or less, the fluorosurfactant improves the reliability of the recording ink by alleviating the problems that occur when the recording ink is stored at high temperatures, such as increased viscosity and aggregation.

When the displacement ink contains a fluorosurfactant, the fluorosurfactant content is preferably in the range of 0.1% to 1.0% by mass, more preferably 0.1% to 0.5% by mass, so that the displacement ink can wet the inside of the ink flow channel faster.

1.4.4.3. Acetylene Glycol Surfactant

Acetylene glycol surfactants, compared to other nonionic surfactants, effectively provide moderate surface and interfacial tensions to liquids and produce little foam. A recording ink that contains an acetylene glycol surfactant can therefore keep a moderate tension on the surface thereof and the interfaces with the components of a printer that come into contact with the recording ink, such as the surface of the nozzles of the printhead. Applying such a recording ink to the ink jet recording technology leads to improved discharge stability.

Examples of acetylene glycol surfactants that can be used include, but are not limited to, SURFYNOL 104, 104E, 104H, 104A, 104BC, 104DPM, 104PA, 104PG-50, 104S, 420, 440, 465, 485, SE, SE-F, 504, 61, DF37, CT111, CT121, CT131, CT136, TG, GA, DF-110D, and 82 (trade names, Air Products and Chemicals, Inc.), OLFINE B, Y, P, A, STG, SPC, E1004, E1010, PD-001, PD-002W, PD-003, PD-004, EXP.4001, EXP.4036, EXP.4051, AF-103, AF-104, AK-02, SK-14, and AE-3 (trade names, Nissin Chemical Industry Co., Ltd.), and ACETYLENOL E00, E00P, E40, and E100 (trade names, Kawaken Fine Chemicals Co., Ltd.).

When the recording ink contains an acetylene glycol surfactant, the acetylene glycol surfactant content is preferably in the range of 0.1% to 2.0% by mass, more preferably 0.2% to 1.0% by mass, so that the recording ink can be easier to load and the resulting recording can be of higher image quality and dry faster. It is also possible that the recording ink contains two or more acetylene glycol surfactants. Likewise, when the displacement ink contains an acetylene glycol surfactant, the acetylene glycol surfactant content is preferably in the range of 0.1% to 2.0% by mass, more preferably 0.2% to 1.0% by mass, so that the recording ink can be more easily replaced with the displacement ink and vice versa. It is also possible that the displacement ink contains two or more acetylene glycol surfactants.

Preferably, the first surfactant and the second surfactant include a surfactant of the same category. This makes the inks more compatible with each other, thereby allowing for better refilling and providing better clogging prevention. The term of the same category, as used herein, means that both of the first and second surfactants include a silicone surfactant or both of the first and second surfactants include a fluorosurfactant.

It is also preferred that the first surfactant has a greater surface-tension-reducing effect on water than the second surfactant. Selecting the first and second surfactants so that the first surfactant will have a greater surface-tension-reducing effect allows for better refilling and provides better clogging prevention. The term surface-tension-reducing effect, as used herein, refers to the difference (absolute value) between the surface tension of water and that of an aqueous solution that contains 0.1% by mass first or second surfactant (containing 99.9% by mass water). The surface tension of such a solution can be measured by, for example, the Wilhelmy method using an ordinary surface tensiometer (e.g., CBVP-Z surface tensiometer available from Kyowa Interface Science Co., Ltd.) at a liquid temperature of 25° C. The surface tension of water is approximately 72 mN/m.

1.4.5. Alkyl Polyols with a Normal Boiling Point of 280° C. or More

The recording ink is substantially free of alkyl polyols with a normal boiling point of 280° C. or more, which would affect the abrasion resistance of the recordings produced with the recording ink. The term substantially free of, as used herein, is not a strict limitation and means that the amount of a constituent does not exceed the level at which its presence is fully significant. The recording ink may therefore contain some amount of alkyl polyols unless the abrasion resistance of the recording is affected. The amount of alkyl polyols with a normal boiling point of 280° C. or more in the recording ink is preferably in the range of 0% by mass inclusive to less than 1.0% by mass based on the total mass of the recording ink, more preferably 0% by mass inclusive to less than 0.5% by mass, even more preferably 0% by mass inclusive to less than 0.1% by mass, yet more preferably 0% by mass inclusive to less than 0.05% by mass, still more preferably 0% by mass inclusive to less than 0.01% by mass, and most preferably 0% by mass inclusive to less than 0.001% by mass, so that the resulting recording can be more resistant to abrasion.

The displacement ink contains an alkyl polyol with a normal boiling point of 280° C. or more. This prevents the displacement ink from drying out in the ink flow channel and the head of the recording apparatus, thereby limiting the clogging that occurs when dried ink adheres to the inside of these components. Examples of alkyl polyols with a normal boiling point of 280° C. or more that can be used include, but are not limited to, glycerol (which normally boils at 290° C.), reducing sugars, and polyethylene glycol compounds. It is also possible to use a combination of two or more alkyl polyols with a normal boiling point of 280° C. or more.

The amount of the alkyl polyol with a normal boiling point of 280° C. or more in the displacement ink is preferably in the range of 5% by mass to 30% by mass, both inclusive, based on the total mass of the displacement ink, more preferably 10% by mass to 20% by mass, both inclusive, so that the displacement ink can have a kinetic viscosity that falls within an appropriate range and that the displacement ink can be slower to dry and more stable during storage.

1.4.6. Aprotic Polar Solvent

The displacement ink contains an aprotic polar solvent. Although the displacement ink may happen to contain some amount of the recording ink after displacing the recording ink, the aprotic polar solvent prevents the pigment and other constituents of the recording ink from being fully solidified, thereby contributing to the effective prevention of clogging. Examples of aprotic polar solvents that can be used include, but are not limited to, dimethylsulfoxide (DMSO), dimethylformamide (DMF), hexamethylphosphoramide (HMPA), pyrrolidones, and dioxane. It is also possible to use two or more aprotic polar solvents in combination.

In particular, pyrrolidones enhance the fixation of the recording ink to the recording medium. Examples of pyrrolidones that can be used include, but are not limited to, N-methyl-2-pyrrolidone, N-ethyl-2-pyrrolidone, N-vinyl-2-pyrrolidone, 2-pyrrolidone, N-butyl-2-pyrrolidone, and 5-methyl-2-pyrrolidone. It is also possible to use two or more such pyrrolidones in combination.

The amount of the aprotic polar solvent in the displacement ink is preferably in the range of 1.0% to 25.0% by mass, more preferably 5.0% to 20.0% by mass.

1.4.7. Antifoam

Preferably, at least one of the displacement ink and the recording ink contains an antifoam. The use of an antifoam in the recording ink allows more stable recording. The use of an antifoam in the displacement ink helps to prevent clogging by allowing the displacement ink to more effectively displace the recording ink.

Examples of antifoams for such purposes include, but are not limited to, silicone-based antifoams, polyethers, fatty acid esters, and acetylene derivatives. In particular, silicone-based antifoams and acetylene derivatives are highly effective in breaking foam. It is also possible to use two or more antifoams in each ink.

When an antifoam is used, it is preferred that the hydrophilic-lipophilic balance (HLB) number of the antifoam according to the Griffin method is 6 or less, more preferably 5 or less. Antifoams with an HLB number of 6 or less are effective in controlling foaming in the ink flow channel during cleaning and thus reducing poor discharge of the recording ink and the displacement ink due to foam intrusion. The use of an antifoam with an HLB number of 5 or less in the displacement ink is particularly preferred when the ink set is used with a piezoelectric ink jet recording apparatus; this type of ink jet recording apparatus more often suffers from poor discharge due to foaming in ink flow channels than others.

The HLB number, used in this embodiment to select antifoams, is an index of the hydrophilicity of compounds proposed by Griffin. The HLB number of an antifoam is calculated by formula (1). Griffin's HLB number ranges from 0 to 20, with a larger number representing higher hydrophilicity.

HLB number=20×(amount of hydrophilic groups, % by mass)=20×(total formula weight of hydrophilic groups/molecular weight of the antifoam)    Formula (1)

Specific examples of antifoams that have an HLB number of 6 or less include, but are not limited to, SURFYNOL 104, 104E, 104H, 104A, 104BC, 104DPM, 104PA, 104PG-50, 104S, 420, DF-110D, and 82 (trade names, Air Products and Chemicals, Inc.) and BYK-011, BYK-012, BYK-017, BYK-018, BYK-019, BYK-020, BYK-021, BYK-022, BYK-023, BYK-024, BYK-025, BYK-028, BYK-038, BYK-044, BYK-080A, BYK-094, BYK-1610, BYK-1615, BYK-1650, BYK-1730, and BYK-1770 (trade names, BYK Japan KK).

The antifoam content of each ink is preferably in the range of 0.1% to 2.0% by mass, more preferably 0.2% to 1.0% by mass, so that the inks can be more unlikely to foam and be better solvents for the antifoam.

1.4.8. Additives

The recording ink and the displacement ink in this embodiment may contain additives such as powder waxes, resin dispersants, glycol ethers, pH-adjusting agents, preservatives/antimolds, antirusts, and chelating agents. Such additives can enhance the characteristics of the recording ink and the displacement ink used in this embodiment.

Powder Waxes

Powder waxes can lubricate the surface of the recorded image. Lubrication protects the image from damage such as peeling and abrasion and improves the fixation of the image to the recording medium.

Examples of powder waxes that can be used include, but are not limited to, the following: plant and animal waxes such as carnauba wax, candelilla wax, beeswax, rice wax, and lanolin; petroleum waxes such as paraffin waxes, microcrystalline waxes, polyethylene waxes, oxidized polyethylene waxes, and petrolatum; mineral waxes such as montan wax and ozokerite; synthetic waxes such as carbon waxes, Hoechst wax, polyolefin waxes, and stearic acid amides; natural and synthetic wax emulsions such as α-olefin-maleic anhydride copolymers; and compound waxes. One or a combination of two or more such powder waxes can be used.

Commercially available powder waxes can also be used. Examples include NOPCOTE PEM-17 (trade name, San Nopco Limited), CHEMIPEARL W4005 (trade name, Mitsui Chemicals, Inc.), and AQUACER 515, 549, and 593 (trade names, BYK Japan KK).

Resin Dispersants

The recording ink in this embodiment may contain a resin dispersant that helps the pigment to disperse in the ink. Both water-soluble and water-insoluble resin dispersants can be used.

Examples of resin dispersants that can be used include, but are not limited to, polyvinyl alcohols, polyacrylic acid, acrylic acid-acrylonitrile copolymers, vinyl acetate-acrylate copolymers, acrylic acid-acrylate copolymers, styrene-acrylic acid copolymers, styrene-methacrylic acid copolymers, styrene-methacrylic acid-acrylate copolymers, styrene-α-methylstyrene-acrylic acid copolymers, styrene-α-methylstyrene-acrylic acid-acrylate copolymers, styrene-maleic acid copolymers, styrene-maleic anhydride copolymers, vinyl naphthalene-acrylic acid copolymers, vinyl naphthalene-maleic acid copolymers, vinyl acetate-maleate copolymers, vinyl acetate-crotonic acid copolymers, vinyl acetate-acrylic acid copolymers, and salts of such copolymers.

To be used as resin dispersants, such copolymers can form salts with basic compounds such as ammonia, ethylamine, diethylamine, triethylamine, propylamine, isopropylamine, dipropylamine, butylamine, isobutyl amine, aminomethylpropanol, and morpholine.

Glycol Ethers

The recording ink and the displacement ink in this embodiment may contain a glycol ether. Glycol ethers enhance the fixation of the recording ink and the displacement ink to the recording medium by helping the recording ink to wet and spread on the surface of the medium.

Examples of glycol ethers that can be used for such purposes include, but are not limited to, ethylene glycol monoisobutyl ether, ethylene glycol monohexyl ether, ethylene glycol monoisohexyl ether, diethylene glycol monohexyl ether, triethylene glycol monohexyl ether, diethylene glycol monoisohexyl ether, triethylene glycol monoisohexyl ether, ethylene glycol monoisoheptyl ether, diethylene glycol monoisoheptyl ether, triethylene glycol monoisoheptyl ether, ethylene glycol monooctyl ether, ethylene glycol monoisooctyl ether, diethylene glycol monoisooctyl ether, triethylene glycol monoisooctyl ether, ethylene glycol mono-2-ethylhexyl ether, diethylene glycol mono-2-ethylhexyl ether, triethylene glycol mono-2-ethylhexyl ether, diethylene glycol mono-2-ethylpentyl ether, ethylene glycol mono-2-ethylpentyl ether, ethylene glycol mono-2-methylpentyl ether, diethylene glycol mono-2-methylpentyl ether, propylene glycol monobutyl ether, dipropylene glycol monobutyl ether, tripropylene glycol monobutyl ether, propylene glycol monopropyl ether, dipropylene glycol monopropyl ether, and tripropylene glycol monomethyl ether. It is possible to use two or more such glycol ethers in combination.

pH-Adjusting Agents

Examples of pH-adjusting agents that can be used include, but are not limited to, potassium dihydrogen phosphate, disodium hydrogen phosphate, sodium hydroxide, lithium hydroxide, potassium hydroxide, ammonia, diethanolamine, triethanolamine, triisopropanolamine, potassium carbonate, sodium carbonate, and sodium bicarbonate. Each ink may contain one or a combination of two or more such pH-adjusting agents.

Preservatives/Antimolds

Examples of preservatives/antimolds that can be used include, but are not limited to, sodium benzoate, sodium pentachlorophenol, sodium 2-pyridinethiol-1-oxide, sodium sorbate, sodium dehydroacetate, and 1,2-dibenzisothiazolin-3-one. Appropriate commercially available products include PROXEL XL2 and GXL (trade names, Avecia, Inc.) and DENICIDE CSA and NS-500W (trade names, Nagase ChemteX Corporation). Each ink may contain one or a combination of two or more such preservatives/antimolds.

Antirusts

Examples of antirusts that can be used include, but are not limited to, benzotriazole.

Chelating Agents

Examples of chelating agents that can be used include, but are not limited to, ethylenediaminetetraacetic acid and its salts (e.g., disodium dihydrogen ethylenediaminetetraacetate) and iminodisuccinic acid and its salts.

1.5. Preparation of the Recording Ink and the Displacement Ink

The recording ink and the displacement ink in this embodiment are obtained by mixing the constituents described above in no particular order and then optionally removing impurities by filtration or other purification techniques. In a suitable method, the materials are sequentially put into a vessel that has a stirring mechanism, e.g., a mechanical stirrer or a magnetic stirrer, and blended in the vessel. The obtained mixture may be purified by centrifugation, filtration, or any other suitable technique if necessary.

1.6. Characteristics of the Recording Ink and the Displacement Ink

Surface Tension

The surface tension at 25° C. (also simply referred to as the surface tension hereinafter) of the recording ink is defined as $\gamma_1$ (mN/m), and the surface tension at 25° C. of the displacement ink is defined as 72 (mN/m). The relation between the surface tension of the recording ink and that of the displacement ink satisfies formula (2).

$$\gamma_1 > \gamma_2 \qquad \text{Formula (2)}$$

The difference in surface tension ($\gamma_1 - \gamma_2$) is preferably in the range of 0.1 to 10.0, more preferably 0.5 to 5.0. This allows for better refilling and provides better clogging prevention.

With a surface tension lower than that of the recording ink, the displacement ink helps the recording ink to flow in the ink flow channel and effectively prevents the problems that would occur while the recording ink is loaded, such as foam intrusion, thereby making the recording head less likely to become clogged.

The surface tension of the recording ink used in this embodiment is preferably in the range of 15 to 30 mN/m, more preferably 18 to 28 mN/m, so that the recording ink can wet and spread on the surface of the recording medium faster and can be more firmly fixed in the image. The surface tension of the recording ink can be measured by, for example, using CBVP-Z automatic surface tensiometer (trade name, Kyowa Interface Science Co., Ltd.) where a platinum plate is wet with the recording ink and the surface tension is measured at 25° C.

The surface tension of the displacement ink in this embodiment is preferably in the range of 15 to 28 mN/m, more preferably 15 to 25 mN/m, so that the recording ink can be more easily replaced with the displacement ink and vice versa and that both inks can be easier to load. Furthermore, adjusting the surface tension of the displacement ink to within these ranges ensures that the inks maintain their characteristics for the most part when mixed during replacement. The surface tension of the displacement ink can be measured in a way similar to that for the surface tension of the recording ink.

Kinetic Viscosity

The kinetic viscosity at 20° C. (also simply referred to as the viscosity hereinafter) of the recording ink is defined as $\eta_1$ (mm$^2$/s), and the kinetic viscosity at 20° C. of the displacement ink is defined as $\eta_2$ (mm$^2$/s). Preferably, the relation between the kinetic viscosity of the recording ink and that of the displacement ink satisfies formula (3).

$$\eta_1 > \eta_2 \quad \text{Formula (3)}$$

The displacement ink, which contains an alkyl polyol with a normal boiling point of 280° C. or more, would affect the abrasion resistance of the recording if remaining in the recording ink. In this embodiment, the viscosity of the displacement ink is lower than that of the recording ink, and this provides the following advantages. The displacement ink is easy to remove, and the ink flow channel can be refilled with the recording ink with no displacement ink mixed in the recording ink; the ink set according to this embodiment therefore provides good abrasion resistance to the recording. The displacement ink is so easy to remove that it requires only a small amount of the recording ink to wash away the displacement ink; the amount of waste recording ink is reduced. Furthermore, the inks maintain their characteristics for the most part even when mixed during replacement.

The difference in kinetic viscosity ($\eta_1 - \eta_2$) is preferably in the range of 0.1 to 5.0, more preferably 0.5 to 2.5. This makes the recording ink and the displacement ink even easier to load and more unlikely to cause clogging.

The kinetic viscosity of the displacement ink is lower than that of the recording ink, making the displacement ink easier to remove. As a result, the ink flow channel can be refilled with the recording ink with no displacement ink mixed in the recording ink; the use of the ink set according to this embodiment therefore leads to enhanced abrasion resistance of the recording.

The kinetic viscosity of the recording ink used in this embodiment is preferably in the range of 2.0 to 20.0 mm$^2$/s, more preferably 3.0 to 10.0 mm$^2$/s, when measured at 20° C. so that the recording ink can be more easily replaced with the displacement ink and vice versa. The kinetic viscosity of the recording ink can be measured by, for example, observation at 20° C. using Cannon-Fenske VMC viscometer and VMC-352 automatic kinetic viscosity tester (trade names, RIGO Co. Ltd.).

The kinetic viscosity of the displacement ink in this embodiment is preferably in the range of 1.0 to 20.0 mm$^2$/s, more preferably 2.0 to 10.0 mm$^2$/s, when measured at 20° C. so that the recording ink can be more easily replaced with the displacement ink and vice versa. The kinetic viscosity of the displacement ink can be measured in a way similar to that for the kinetic viscosity of the recording ink.

pH

The pH of the recording ink is defined as $pH_1$, and the pH of the displacement ink is defined as $pH_2$. Preferably, the relation between the pH of the recording ink and that of the displacement ink satisfies formula (4) so that the recording ink and the displacement ink can be more unlikely to aggregate and more compatible with each other. The increased compatibility between the two ink compositions makes the recording ink easier to wash away with the displacement ink and can even improve the storage stability of the recording ink.

$$pH_1 \leq pH_2 + 1 \quad \text{Formula (4)}$$

The recording ink is preferably neutral or alkaline. More specifically, the pH of the recording ink is preferably in the range of 7.0 to 10.0 at 20° C. so that the recording ink can have good storage stability and dispersion stability. Where the ink flow channel of the ink jet recording method has metallic components, adjusting the pH of the recording ink to within these ranges also effectively prevents the recording ink from corroding or otherwise seriously damaging such components.

Likewise, the displacement ink is preferably neutral or alkaline. More specifically, the pH of the displacement ink is preferably in the range of 7.0 to 10.0 at 20° C. so that the displacement ink can have good storage stability. Where the ink flow channel of the ink jet recording method has metallic components, adjusting the pH of the displacement ink to within these ranges also effectively prevents the displacement ink from corroding or otherwise seriously damaging such components.

In addition, the freezing point of the displacement ink used in this embodiment is preferably −15° C. or less, more preferably −20° C. or less, under an equivalent to one atmosphere of pressure. This allows the user to use the displacement ink to protect the ink flow channel of the ink jet recording apparatus from damage during transportation by filling the ink flow channel with the displacement ink beforehand.

2. Ink Jet Recording Apparatus

An ink jet recording apparatus according to another embodiment of the invention has the ink set described above, an ink jet recording head (also simply referred to as a head hereinafter), and an ink flow channel. The recording ink and the displacement ink in this embodiment are supplied from an ink container to the head via the ink flow channel. Droplets of the recording ink are discharged from nozzles located on the head toward a recording medium. The recording ink forms an image on the recording medium, producing a recording.

Figure 1:
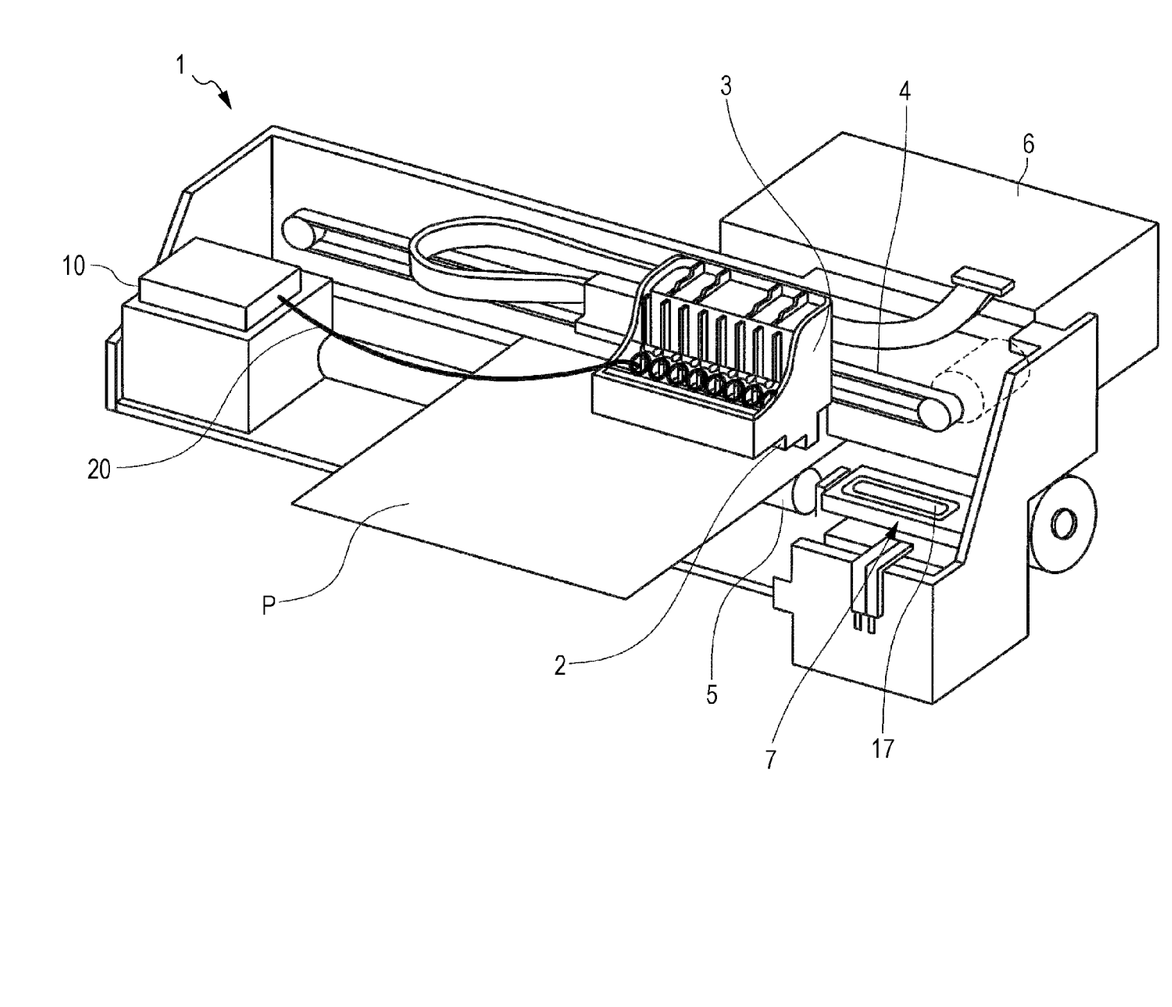

The following describes an ink jet recording apparatus according to this embodiment, which has a head configured to discharge the recording ink and the displacement ink, with reference to the FIG. 1. In the FIG. 1, the scale varies between the individual components so that all components should be visible. This embodiment illustrates an ink jet printer (hereinafter simply referred to as a printer) as an example of an ink jet recording apparatus. This should not be construed as limiting this aspect of the invention to this structure of an apparatus.

The FIGURE is a perspective view of the structure of a printer 1 according to this embodiment. The printer 1 in the FIGURE is a serial printer. A serial printer has a carriage that moves in a predetermined direction, and the head is located on the carriage. The head moves with the carriage and discharges droplets of ink toward a recording medium.

As illustrated in the FIGURE, the printer 1 has a carriage 3 for a printhead 2, a carriage-moving mechanism 4 that moves the carriage 3 in the direction of width of a recording medium P, and a medium-feeding mechanism 5 that feeds the recording medium P in the direction of feeding of the medium. The printer 1 also has a control unit 6 that controls the overall operation of the printer 1. The direction of width of the medium is the primary direction of scanning (the direction of head movement), and the direction of feeding of the medium is the secondary direction of scanning (the direction perpendicular to the primary scanning direction).

As illustrated in the FIGURE, an ink supply tube 20 (an ink flow channel) is disposed between the printhead 2 and an ink container 10 that contains the recording ink and the displacement ink separately. A switcher is used to select which ink, i.e., the recording ink or the displacement ink, should be supplied to the printhead 2.

The printer 1 preferably has a suction pump (not illustrated) configured to replace the recording ink in the ink flow channel (e.g., the ink supply tube 20) with the displacement ink and vice versa as a switcher so that the printer 1 can be even easier to refill with the inks and more unlikely to become clogged. When such a suction pump is used, it is preferred that the suction pump draws a greater total amount of the recording ink and the displacement ink when replacing the displacement ink in the ink flow channel with the recording ink than when replacing the recording ink in the ink flow channel with the displacement ink. Suction pumps that operate to satisfy this condition are more effective than others in reducing the amount of displacement ink residue in the refilling recording ink. The use of such a suction pump therefore allows for better refilling and provides better clogging prevention, thereby enhancing the abrasion resistance of the recording. The location and the structure of such a suction pump can be similar to those of known suction pumps for printers. For example, such a suction pump can be located in the printhead cap, i.e., a cap for removing the inks from the printhead 2, or in the tank for waste ink. Examples of pumps that can be used include a variable-displacement rotary or diaphragm pump.

The illustrated printer 1 is an "off-carriage" printer; the ink container 10 is located, for example, on the casing of the printer 1 and supplies the inks to the printhead 2 via the ink supply tube 20. However, this is not the only structure that printers according to this embodiment may have. For example, "on-carriage" printers (printers that have ink cartridges on the carriage) and line printers (printers that have no carriage) can also be used.

The printhead 2 has a home position, which is the point from which scanning starts and is located in the range of movement of the printhead 2 and outside of the area where the recording medium P is transported. A maintenance unit 7 that has a cap component 17 is located in this home position.

The maintenance unit 7 has several functions such as moisture retention, flushing, and head cleaning. More specifically, the maintenance unit 7, for example, covers the printhead 2 with the cap component 17 while the printer is not in the recording process to reduce the drying of the nozzle openings (not illustrated) of the printhead 2, allows the printhead 2 to discharge the recording ink into the cap component 17 through the nozzle openings prior to recording to prevent the clogging of the nozzle openings and related problems, and cleans the printhead 2 by covering the printhead 2 with the cap component 17 and then operating the suction pump (not illustrated) to remove the ink existing in the nozzle openings and replace the recording ink in the ink flow channel with the displacement ink or vice versa.

3. Maintenance of the Ink Jet Recording Apparatus

Another embodiment of the invention is a method for the maintenance of an ink jet recording apparatus and includes replacing a recording ink in an ink flow channel with a displacement ink and vice versa, and these recording and displacement inks are those included in the ink set described above. More specifically, the method for maintenance according to this embodiment includes washing the recording ink away from the ink flow channel of the above-described ink jet recording apparatus with the displacement ink (a washing process) and loading the recording ink again by replacing the displacement ink in the ink flow channel with the recording ink (a refilling process).

In this method for the maintenance of an ink jet recording apparatus, the displacement ink is introduced into the ink flow channel that contains the recording ink to replace the recording ink in the ink flow channel with the displacement ink. The substances that accumulate in the ink flow channel, such as ink concentrate, are removed with the recording ink through the nozzles of the recording head, making the ink flow channel clean. An example of a method for replacing an ink in the ink flow channel with another is the aforementioned head cleaning.

The washed ink flow channel can be left with the displacement ink inside if the ink jet recording apparatus is left unused for a long period of time. This prevents solid recording ink residue from occurring.

Then the ink jet recording apparatus can be made ready for operation by introducing the recording ink into the ink flow channel, which is filled with the displacement ink, to remove the displacement ink through the nozzles of the recording head and refill the ink flow channel with the recording ink.

In the method for the maintenance of an ink jet recording apparatus according to this embodiment it is preferred to use a greater amount of the recording ink to replace the displacement ink in the ink flow channel than the amount of the displacement ink used to replace the recording ink in the displacement ink. This further reduces the amount of displacement ink residue in the refilling recording ink, allows for better refilling and provides better clogging prevention, and, as a result, enhances the abrasion resistance of the recording.

The method for the maintenance of an ink jet recording apparatus according to this embodiment is advantageous in several ways because of the use of the ink set described above. For example, this method reduces the occurrence of the problems associated with the use of the recording ink, such as clogged head nozzles or ink flow channel; this method is effective in keeping the flow channel for the recording ink clean.

In the washing process in this embodiment it is preferred that the displacement ink passes through the ink flow channel at a flow rate of 0.1 mL/(sec·mm$^2$) or more while the recording ink is in the ink flow channel. This allows the displacement ink to more quickly wash away the recording ink from the ink flow channel and makes the method for maintenance according to this embodiment more effective in keeping the ink flow channel clean.

EXAMPLES

The following illustrates some examples and comparative examples of the invention to describe some aspects of the invention in more detail. These examples should not be construed as limiting the scope of the invention.

1. Materials for Ink Compositions

The following is a list of major ingredients used to prepare the ink compositions used in Examples and Comparative Examples.

Pigment
  C.I. Pigment Blue 15:3
Silicone Surfactants
  BYK-348 (trade name, BYK Japan KK)
  BYK-349 (trade name, BYK Japan KK)
Acetylene Glycol Surfactant
  OLFINE E1010 (trade name, Nissin Chemical Industry Co., Ltd.; HLB number=3)

Antifoam
  SURFYNOL DF-110D (trade name, Air Products and Chemicals, Inc.; HLB number=3)
Resin Dispersant
  A water-soluble acrylic resin
Solid Binder Resin
  A styrene-acrylic acid emulsion (JONCRYL 352J available from BASF Japan Ltd.; $T_g$=80° C.)
Solvents
  Propylene glycol
  Glycerol
  1,2-Hexanediol
  2-Pyrrolidone
  triethylene glycol monobutyl ether 2. Preparation of the Ink Compositions Examples 1 to 3 and Comparative Examples 1 to 4

Recording inks and displacement inks were prepared in accordance with the proportions of ingredients in presented Table 1. The materials specified in Table 1 were blended in a vessel using a magnetic stirrer for 2 hours, and the obtained mixture was purified through a 5-µm membrane filter to remove dust, coarse particles, and other impurities. All values in Table 1 are in % by mass, and ion-exchanged water was added to make the total mass of the recording and displacement ink 100% by mass.

lent to the volume of the ink flow channel of the printer was delivered at a flow rate of 2 mL/sec to load the printer with the displacement ink. The modified PX-G930 loaded with the displacement ink was stored at room temperature for 90 days. Then the ink cartridge was changed to that of the recording ink. The pump of the modified PX-G930 was activated, and the recording ink equivalent to the volume of the ink flow channel of the printer was delivered at a flow rate of 2 mL/sec to load the printer with the recording ink. A recording was produced using the modified PX-G930 refilled with the recording ink, and the combination of inks was evaluated for the potential to cause clogging in accordance with the following criteria.

Evaluation Criteria

○: No nozzle became clogged.

x: Clogging was apparent from irregular discharge.

Refilling Test

The modified PX-G930 was loaded with the recording ink. Then the ink cartridge was changed to one that contained the displacement ink. The pump of the modified PX-G930 was activated, and the displacement ink equivalent to the volume of the ink flow channel of the printer was delivered at a flow rate of 2 mL/sec to load the printer with the displacement ink. The modified PX-G930 loaded with

TABLE 1

|  |  | Recording ink1 | Recording ink 2 | Displacement ink 1 | Displacement ink 2 | Displacement ink 3 | Displacement ink 4 | Displacement ink 5 | Displacement ink 6 |
|---|---|---|---|---|---|---|---|---|---|
| Solid pigment | PB15:3 | 4.0 | 4.0 |  |  |  |  |  |  |
| Surfactants | BYK348 | 0.8 |  | 0.3 |  |  |  |  |  |
|  | BYK349 |  | 0.6 |  | 0.2 | 0.2 |  | 0.2 | 0.2 |
|  | DF110D | 0.5 | 0.5 | 0.3 | 0.3 | 0.3 | 0.3 |  | 0.3 |
|  | E1010 |  |  |  |  |  | 1.0 |  |  |
| Resin dispersant | Water-soluble acrylic resin | 1.0 | 1.0 |  |  |  |  |  |  |
| Solid binder Resin | Styrene-acrylic acid resin emulsion | 1.0 | 1.0 |  |  |  |  |  |  |
| Solvent | Propylene glycol | 15.0 | 15.0 | 10.0 | 10.0 | 10.0 | 10.0 | 10.0 | 10.0 |
|  | Glycerol |  |  | 15.0 | 15.0 |  | 15.0 | 15.0 | 35.0 |
|  | 1,2-Hexanediol | 5.0 | 5.0 | 4.0 | 8.0 |  | 4.0 | 4.0 | 8.0 |
|  | 2-Pyrrolidone | 15.0 | 15.0 | 10.0 | 10.0 | 10.0 | 10.0 | 10.0 |  |
|  | Triethylene glycol monobutyl ether |  |  |  |  | 20.0 |  |  |  |
| Viscosity mm$^2$/s |  | 5.3 | 5.2 | 3.7 | 4.4 | 4.2 | 3.9 | 3.6 | 7.6 |
| Surface tension mN/m |  | 24.6 | 24.0 | 22.7 | 23.3 | 23.5 | 28.1 | 21.6 | 24.5 |

3. Ink Jet Recording Apparatus

PX-G930 ink jet printer (Seiko Epson Corporation; nozzle pitch=180 dpi) was modified by attaching a variable-speed rotary pump to the head-cleaning cap of the printer. This modified PX-G930 was used in the following tests.

4. Testing

Clogging

Some combinations of the prepared inks were used with the modified PX-G930 and evaluated for the potential to cause clogging in accordance with the criteria below.

Clogging Test

The modified PX-G930 was loaded with the recording ink. Then the ink cartridge was changed to one that contained the displacement ink. The pump of the modified PX-G930 was activated, and the displacement ink equivathe displacement ink was stored at room temperature for 1 day. Then the ink cartridge was changed to that of the recording ink. The pump of the modified PX-G930 was activated, and the recording ink equivalent to four times the volume of the ink flow channel of the printer was delivered at a flow rate of 2 mL/sec to load the printer with the recording ink. A recording was made on a sheet of PET film (LUMIRROR S10, Toray Industries, Inc.) using the modified PX-G930 refilled with the recording ink and then left at room temperature for 1 day. The quality of refilling was evaluated by measuring the abrasion resistance of the recording in accordance with the following criteria.

Evaluation Criteria

○: Abrasion under a load of 500 g did not damage the recording to expose the substrate.

x: Abrasion under a load of 500 g damaged the recording to expose the substrate.

TABLE 2

|  | Example 1 | Example 2 | Example 3 | Comparative Example 1 | Comparative Example 2 | Comparative Example 3 | Comparative Example 4 |
|---|---|---|---|---|---|---|---|
| Recording ink | Recording ink 1 | Recording ink 2 | Recording ink 2 | Recording ink 2 | Recording ink 2 | Recording ink 2 | Recording ink 2 |
| Displacement ink | Displacement ink 1 | Displacement ink 1 | Displacement ink 2 | Displacement ink 3 | Displacement ink 4 | Displacement ink 5 | Displacement ink 6 |
| Clogging | ○ | ○ | ○ | x | x | x | ○ |
| Refilling | ○ | ○ | ○ | ○ | ○ | ○ | x |

Examples 1 to 3 did not cause clogging. In these examples, the displacement ink contained an alkyl polyol with a normal boiling point of 280° C. or more and was easy to load owing to its low surface tension compared to the recording ink. Comparative Example 1, in which the displacement ink contained no alkyl polyols with a normal boiling point of 280° C. or more, caused clogging. In Comparative Example 2, in which the displacement ink had a surface tension higher than that of the recording ink, the recording ink was not displaced to the displacement ink. Comparative Example 2 also caused clogging resulted from the adhesion of solid recording ink residue. In Comparative Example 3, in which the displacement ink contained no antifoams, was also found to cause clogging, foam was present in the ink flow channel of the printer while the recording ink was replaced with the displacement ink. Comparative example 3 also found to cause clogging resulted from the adhesion of solid recording ink residue.

Furthermore, the recordings produced in Examples 1 to 3 were highly resistant to abrasion. In these examples, the displacement ink was well replaced with the recording ink owing to its low viscosity compared to the recording ink, and the alkyl polyol with a normal boiling point of 280° C. or more in the displacement ink did not remain in the refilling recording ink. The recording in Comparative Example 4, in which the displacement ink contained more than 30% alkyl polyol with a normal boiling point of 280° C. or more and was more viscous than the recording ink, was not as resistant to abrasion because the displacement ink was not well replaced with the recording ink and the alkyl polyol with a normal boiling point of 280° C. or more remained in the refilling recording ink.

The entire disclosure of Japanese Patent Application No. 2013-032939, filed Feb. 22, 2013 is expressly incorporated by reference herein.

What is claimed is:

1. An ink set for use in an ink jet recording apparatus having an ink flow channel, the ink set comprising:
   a recording ink containing a pigment, a resin, water, and a first surfactant and substantially free of alkyl polyols with a normal boiling point of 280° C. or more, the resin including at least one of a water-soluble resin and a resin emulsion, and the first surfactant including at least one of a silicone surfactant and a fluorosurfactant; and
   a displacement ink containing water, a second surfactant, an aprotic polar solvent, and an alkyl polyol with a normal boiling point of 280° C. or more, the second surfactant including at least one of a silicone surfactant and a fluorosurfactant,
   wherein the recording ink has a higher surface tension than a surface tension of the displacement ink; and
   the displacement ink is configured to displace the recording ink from the ink flow channel of the ink jet recording apparatus, and clean the ink flow channel of the ink jet recording apparatus.

2. The ink set according to claim 1, wherein the displacement ink has a kinetic viscosity lower than a kinetic viscosity of the recording ink.

3. The ink set according to claim 1, wherein the first surfactant and the second surfactant include a surfactant of a single category.

4. The ink set according to claim 1, wherein at least one of the displacement ink and the recording ink contains an antifoam.

5. The ink set according to claim 1, wherein the first surfactant has a greater surface-tension-reducing effect on water than the second surfactant.

6. An ink jet recording apparatus comprising the ink set according to claim 1, an ink jet recording head, and the ink flow channel.

7. An ink jet recording apparatus comprising the ink set according to claim 2, an ink jet recording head, and the ink flow channel.

8. An ink jet recording apparatus comprising the ink set according to claim 3, an ink jet recording head, and the ink flow channel.

9. An ink jet recording apparatus comprising the ink set according to claim 4, an ink jet recording head, and the ink flow channel.

10. An ink jet recording apparatus comprising the ink set according to claim 5, an ink jet recording head, and the ink flow channel.

11. The ink jet recording apparatus according to claim 6, further comprising a suction pump configured to replace the recording ink in the ink flow channel with the displacement ink and vice versa.

12. The ink jet recording apparatus according to claim 6, wherein the suction pump draws a greater total amount of the recording ink and the displacement ink when replacing the displacement ink in the ink flow channel with the recording ink than when replacing the recording ink in the ink flow channel with the displacement ink.

13. An ink jet recording apparatus comprising:
   an ink jet recording head having an ink flow channel; and
   an ink set including a recording ink and a cleaning ink in communication with the ink flow channel,
   wherein the recording ink contains a pigment, a resin, water, and a first surfactant and substantially free of alkyl polyols with a normal boiling point of 280° C. or more, the resin including at least one of a water-soluble resin and a resin emulsion, and the first surfactant including at least one of a silicone surfactant and a fluorosurfactant;
   the cleaning ink contains water, a second surfactant, an aprotic polar solvent, and an alkyl polyol with a normal boiling point of 280° C. or more, the second surfactant including at least one of a silicone surfactant and a fluorosurfactant;

the recording ink has a higher surface tension than a surface tension of the cleaning ink; and after using the ink jet head to deposit the recording ink, the cleaning is configured to displace the recording ink from the ink flow channel of the ink jet recording head, and clean the ink flow channel of the ink jet recording head.

14. The ink jet recording apparatus according to claim 13, wherein the cleaning ink has a kinetic viscosity lower than a kinetic viscosity of the recording ink.

15. The ink set according to claim 13, wherein the first surfactant and the second surfactant include a surfactant of a single category.

16. The ink set according to claim 13, wherein at least one of the displacement ink and the cleaning ink contains an antifoam.

17. The ink set according to claim 13, wherein the first surfactant has a greater surface-tension-reducing effect on water than the second surfactant.

18. The ink set according to claim 1, wherein the aprotic solvent of the displacement ink is selected from the group of dimethylsulfoxide (DMSO), dimethylformamide (DMF), and hexamethylphosphoramide (HMPA).

19. The ink jet recording apparatus according to claim 13, wherein the aprotic solvent of the cleaning ink is selected from the group of dimethylsulfoxide (DMSO), dimethylformamide (DMF), and hexamethylphosphoramide (HMPA).

* * * * *